United States Patent [19]

Seakan

[11] 4,177,541

[45] Dec. 11, 1979

[54] BICYCLE CABLE

[75] Inventor: Raymond N. Seakan, Randolph, Mass.

[73] Assignee: Acro-Fab Industries, Inc., Stoughton, Mass.

[21] Appl. No.: 926,310

[22] Filed: Jul. 20, 1978

[51] Int. Cl.² .......................... A44B 21/00; F16G 11/00

[52] U.S. Cl. .......................... 24/73 A; 24/122.3; 70/18; 403/379

[58] Field of Search .......................... 24/73 A, 122.3; 70/18; 403/378, 379

[56] References Cited

U.S. PATENT DOCUMENTS 1,652,249 12/1927 Mathis .......................... 70/18

3,991,445 11/1976 Pennell .......................... 24/73 A

*Primary Examiner*—Bernard A. Gelak

*Attorney, Agent, or Firm*—Wolf, Greenfield & Sacks

[57] ABSTRACT

An armored cable assembly for locking cycles and the like comprising a cable with a welded inner fitting at each end surrounded by a metal sheet or conduit, the end of such sheet and said inner fitting extending into a cylindrical recess in each of a pair of outer fittings and being secured therein by a pin extending through said outer and inner fittings, in a direction normal to the axis of said cable. The outer fittings have each a hole through which the shackle of a padlock may be passed for securing the ends of the cable assembly.

4 Claims, 2 Drawing Figures

BICYCLE CABLE

BACKGROUND OF THE INVENTION

The present invention relates to locking means for bicycles, motorcycles, and the like, and more specifically to an armored locking cable which is resistant to most hacksaws and bolt cutters.

Conventional bicycle locking cables are usually secured by aluminum swaged fittings at their ends. Since aluminum is a relatively soft metal, a long-handled bolt cutter with jaws of a harder metal can often employ sufficient leverage to sever the fittings even if the cable is made of steel and is sufficiently resistant. The cable, however, is typically either not sheathed or is sheathed with a soft, flexible plastic which protects only against corrosion. If bolt cutters do not work on the fittings, a hacksaw will usually sever the cable, particularly if it can attack the cable strand by strand. Cable cutters can likewise be used if the diameter of the cable is small enough.

In addition to soft fittings and unsheathed cable, a third common problem with cable assemblies is their lack of flexibility. Since a solid cable of sufficient diameter would hardly bend at all, stranded cable is typically used. Bending a stranded cable tends to stretch the strand sections on the outside of the bend and create a restoring force which straightens the cable unless it is confined, such as in a box. This poses a storage problem, especially during travel on the cycle. Even then, the whipping end of a suddenly released coil of cable can be dangerous. A simple security procedure can become a wrestling match with the cable.

Many conventional cables do not allow the purchaser a choice of locks, but rather come with a built-in combination lock comprising three or four digit wheels, i.e., one thousand or ten thousand possible combinations. These can be easily tested by a patient thief.

Accordingly, it is a primary object of the present invention to provide a cycle locking cable with a sheath of a hardness and a diameter which will protect the cable from cutters.

It is a further object of this invention to provide hardened fittings which are reistant to bolt cutters for the ends of a cycle locking cable.

It is still a further object of this invention to make a cycle locking cable easier to handle and to store.

It is yet another object of this invention to give the user a choice of locks, including the option of using a key lock instead of a combination lock.

FEATURES OF THE INVENTION

To accomplish these and other objects, the locking cable of this invention has among its many features a metal sheath or conduit covering the entire length of the cable, hardened inner and outer end fittings, and means for securing the fittings and cable together. A further feature is the use of precoiled cable to simplify recoiling and storage after use.

Yet all of these objects are attained without sacrificing simplicity of design.

BRIEF FIGURE DESCRIPTION

These and other objects, features and advantages of the invention will appear from the following description of a preferred embodiment, as shown in the attached drawings, in which.

DETAILED DESCRIPTION OF THE DRAWINGS

Figure 1:
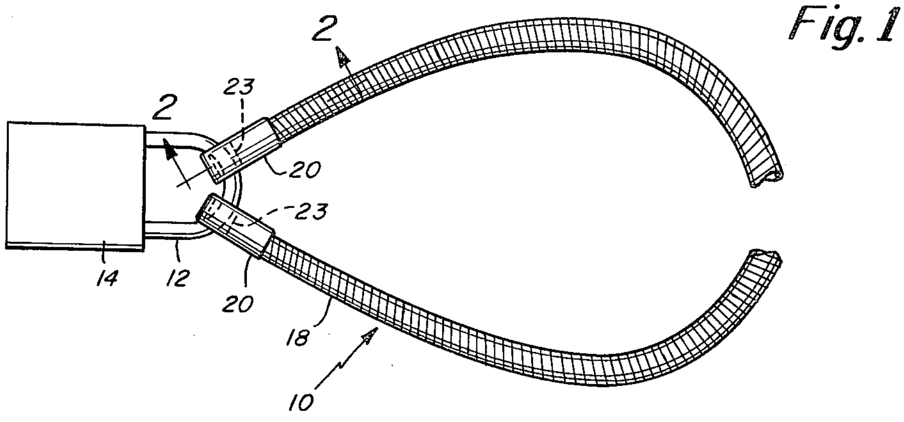
FIG. 1 is a fragmentary plan view showing the ends of the cable secured by its fittings to a padlock.
Figure 2:
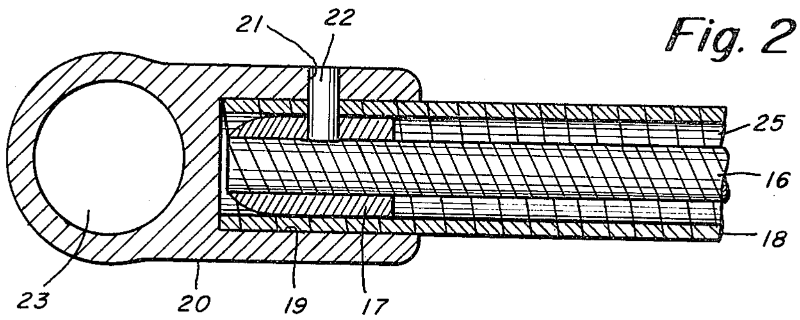
FIG. 2 is an enlarged cross-sectional view of one end of the cable, taken along line 2—2 of FIG. 1.

As illustrated in the drawings, an armored cable comprises a pair of end fittings 20. These end fittings are connected one to each end of the cable assembly 10. The cable assembly 10 comprises a multiple strand twisted cable 16 of any suitable length, as, for example, two or three feet. The cable 16 may typically have a diameter of $\frac{1}{4}$ inch and is comprised of from 7 to 19 strands of cable twisted in a conventional fashion. The cable may comprise a conventional galvanized aircraft cable or a conventional stainless steel cable.

Coaxial with the cable 16 and forming with it the cable assembly 10 is a sheath 18. The sheet 18 is preferably made of galvanized steel or stainless steel and is spirally wound of a flat band of metal interlocked at its edges with adjacent portions of the coiled sheath. Such flexible sheaths are conventionally available and are conventionally used as protective flexible armor.

Preferably, the cable assembly is precoiled so that it will when untensioned form into a coiled configuration. This precoiling is achieved by forming the twisted cable 16 in a precoiled condition by known techniques.

The cable 16 is coaxially positioned within the sheath 18 providing an annular opening 25 which preferably is of a width greater than the thickness of the sheath 18 but narrower than the diameter of the cable 16. The twisted cable 16 and sheath 18 are preferably of equal length and are secured in part at each end in fixed relation to one another by inner fittings 17. These inner fittings 17 are cylindrical in shape with the inner surface of the fittings 17 welded or otherwise fixed to the end of cable 16. Preferably the outer end of the inner fittings 17 are tapered or conical in configuration. The outer surface of the fittings 17 engage in sliding fit the inner surface of sheath 18.

The cable assembly 10 comprising the twisted cable 16, coaxial sheath 18 and inner fittings 17 at each end is engaged by the end fittings 20. The end fittings 20 are secured one at each end of the cable assembly 10. The end fittings 20 are similar in configuration and each comprise in substance a cylindrical element formed of hardened alloy steel which is designed specifically to resist action of bolt cutters. The fitting 20 is provided with an opening normal to its longitudinal axis. This opening 23 is of a diameter sufficient to receive the shackle 12 of a conventional padlock. The fitting 20 is also formed with a cylindrical opening at the end opposite to the end in which the opening 23 is formed. This opening, preferably coaxial with the longitudinal axis of the end fitting 20, has a diameter which is substantially equal to the outer diameter of the sheath 18 and is designed to receive approximately $\frac{3}{4}$ of an inch to 1 inch of the end of the cable assembly 10. The cable assembly 10 is secured at each end to the end fittings 20 by a pin 22 which extends through a close-fitting hole 21 in the end fitting 20 and through aligned holes in the sheath 18 and inner fitting 17. This pin 22 is preferably tapped in the hole 21 and is flush with the outer surface of the end fitting 20 to prevent undesired or unauthorized removal of the pin.

In assembling the armored cable, the twisted cable 16 is first cut to desired length and the inner fittings 17 are welded to opposite ends. The inner fitting 17 is at this stage formed with a hole designed to receive pin 22. The cable 16 is then threaded into sheath 18 which also has been preformed with a hole to receive pin 22 and has been cut to a length of approximately the same length as the twisted cable 16. The holes for receiving pins 22 are aligned one with the other. The end fittings 20 are then slid onto the ends of the cable assembly 10 with the hole 21 aligned with the holes in the sheath 18 and inner fittings 17. A pin 22 is then force fit into the hole 21 and into engagement with the inner fitting 17. The outer end of the pin 22 is then made flush with the outer surface of the end fitting 20.

The assembly is designed to provide a reinforced or armored cable which is difficult to destroy or break. To this end it is important that both the precoiled twisted cable 16 and the armored sheath 18 be formed with materials which are highly resistant to ordinary metal saws, drills or bolt cutters.

In use, the cable assembly 10 is wrapped around or through the frame of a cycle or object to be secured and typically to a rack or permanent fixture. The outer fittings 20 are brought together and the shackle 12 of a conventional padlock passed through the openings 23. The lock may then be conventionally closed and the bicycle or other object thereby secured.

Having now described my invention, I claim:

1. In a cable assembly for locking cycles and the like having an inner flexible steel cable, an outer steel flexible sheath coaxial with said cable, in combination, an inner fitting having an outer diameter less than the inner diameter of said sheath, means permanently securing said inner fitting to said cable, an end fitting having a cylindrical recess shaped and sized to receive an end of said sheath and a pin extending into and permanently interengaging said sheath and said end and inner fittings.

2. A cable assembly as set forth in claim 1 wherein said cable and sheath are substantially coextensive, and having a pair of said inner fittings with means securing one at each end of said cable, a pair of said end fittings and a pair of pins securing one of said end fittings and inner fittings at each end of said cable and sheath.

3. A cable assembly as set forth in claim 2 wherein said end fittings each comprise a cylindrical member with said cylindrical recess extending into one end of said cylindrical member and an opening extending through said cylindrical member remote from said one end of said cylindrical member.

4. A cable assembly as set forth in claim 3 wherein said opening is normal to the axis of said cylindrical member, said inner fitting is cylindrical with said cable extending into one end thereof, and said pin extends normal to the axis of said inner and end fittings.

* * * * *